United States Patent [19]
Danzuka et al.

[11] Patent Number: 6,130,686
[45] Date of Patent: *Oct. 10, 2000

[54] COLOR IMAGE FORMING APPARATUS USING INKS OF PLURAL DENSITIES

[75] Inventors: Toshimitsu Danzuka, Tokyo; Akio Suzuki, Yokohama; Hisashi Fukushima, Kawasaki; Haruhiko Moriguchi, Yokohama; Yasushi Miura, Kawasaki, all of Japan

[73] Assignee: Canon Kabushiki Kaisha, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/974,509

[22] Filed: Nov. 19, 1997

Related U.S. Application Data

[63] Continuation of application No. 08/688,224, Jul. 29, 1996, abandoned, which is a continuation of application No. 08/223,676, Apr. 6, 1994, abandoned.

[30] Foreign Application Priority Data

Apr. 9, 1993 [JP] Japan .................................. 5-083010

[51] Int. Cl.[7] ...................................................... B41J 2/01
[52] U.S. Cl. .............................................. 347/43; 347/15
[58] Field of Search ................................. 347/9, 15, 43, 347/14; 358/515, 518

[56] References Cited

U.S. PATENT DOCUMENTS

| | | | |
|---|---|---|---|
| 4,313,124 | 1/1982 | Hara | 347/57 |
| 4,345,262 | 8/1982 | Shirato et al. | 347/10 |
| 4,459,600 | 7/1984 | Sato et al. | 347/47 |
| 4,463,359 | 7/1984 | Ayata et al. | 347/56 |
| 4,558,333 | 12/1985 | Sugitani et al. | 347/65 |
| 4,608,577 | 8/1986 | Hori | 347/66 |
| 4,635,078 | 1/1987 | Sakurada et al. | 347/15 |
| 4,723,129 | 2/1988 | Endo et al. | 347/56 |
| 4,740,796 | 4/1988 | Endo et al. | 347/56 |
| 4,860,026 | 8/1989 | Matsumoto et al. | 347/19 |
| 4,907,013 | 3/1990 | Hubbard et al. | 347/15 |
| 4,959,659 | 9/1990 | Sasaki et al. | 347/43 |
| 5,030,317 | 7/1991 | Noguchi | 216/27 |
| 5,162,860 | 11/1992 | Nami et al. | 358/501 |
| 5,252,992 | 10/1993 | Fukushima et al. | 347/43 |
| 5,355,159 | 10/1994 | Kaneko | 347/19 |

FOREIGN PATENT DOCUMENTS

| | | |
|---|---|---|
| 54-056847 | 5/1979 | Japan . |
| 59-123670 | 7/1984 | Japan . |
| 59-138461 | 8/1984 | Japan . |
| 60-071260 | 4/1985 | Japan . |
| 62-253457 | 11/1987 | Japan . |
| 2014905 | 4/1990 | Japan . |

*Primary Examiner*—Benjamin R. Fuller
*Assistant Examiner*—Craig A. Hallacher
*Attorney, Agent, or Firm*—Fitzpatrick, Cella, Harper & Scinto

[57] ABSTRACT

A color image forming apparatus includes an image signal input portion which supplies three image signals C, M and Y associated with cyan, magenta and yellow; an image signal conversion processing portion which converts the image signals C, M and Y into six image signals associated with thick C and thin C, thick M and thin M, and thick Y and thin Y, respectively, by using a thick/thin sorting table; and a color masking processing portion which performs color masking process, and outputs converted six image signals associated with thick C to thin Y. The converted six image signals undergo a black generation process, a UCR process and a black printing process, and a binarization processing thereafter. This makes it possible to produce color images of high quality with high reproducibility even if the hues of N color materials, which belong to the same color family and have different densities, such as thin cyan and thick cyan, differ from each other to some extent.

32 Claims, 11 Drawing Sheets

COLOR IMAGE FORMING APPARATUS USING INKS OF PLURAL DENSITIES

This application is a continuation of application Ser. No. 08/688,224 filed Jul. 29, 1996, now abandoned, which is a continuation of application Ser. No. 08/223,676 filed Apr. 6, 1994, abandoned.

BACKGROUND OF THE INVENTION

1. Field of the Invention

The present invention relates to a color image forming apparatus and method. More particularly, it relates to a color image forming apparatus and method which handles image signals associated with different densities of each of the same color families.

2. Description of Related Art

A color ink jet recording apparatus has been conventionally known as one of the color image recording apparatuses. Such a type of color ink jet recording apparatuses has a problem in that dots are often noticeable in highlighted portions. This problem has been dealt with by trying to improve the graininess of highlighted portions by using a plurality of coloring materials of different densities of the same color families such as thin black ink, thick black ink, thin cyan ink, thick cyan ink, thin magenta ink, thick magenta ink, thin yellow ink, and thick yellow ink.

FIG. 1 is a perspective view schematically illustrating a color ink jet recording apparatus as an example of such types of color ink jet recording apparatuses.

In FIG. 1, a roll of recorded medium 5 is transported with transporting rollers 1 and 2, held between a feed rollers 3, and is transported in the direction f by a subscanning motor 4 joined to the feed roller 3. Guide rails 6 and 7 are disposed in parallel across the recorded medium 5, so that recording heads 9 mounted on a carriage 8 scan across the medium.

The carriage 8 is loaded with eight recording heads each for thin black, thick black, thin cyan, thick cyan, thin magenta, thick magenta, thin yellow, and thick yellow, which are designated by 9LBk, 9DBk, 9LC, 9DC, 9LM, 9DM, 9LY and 9DY, respectively. Eight ink reservoirs, which are not shown in this figure, are disposed such that each of them corresponds to one of the eight recording heads.

The recorded medium 5 is incremented intermittently by an amount equal to the recording width of the recording heads 9, which record an image by discharging ink droplets in response to image signals by scanning in the P direction while the recorded medium 5 is at halt.

A signal processing system of such a color image recording apparatus is generally arranged as shown in FIG. 2. Since the arrangement is the same for each one of the four systems of black, cyan, magenta and yellow, only one system is illustrated here.

In FIG. 2, a thick/thin sorting portion 31 separates an input image signal into an image signal associated with thin ink and an image signal associated with thick ink using a sorting table having characteristics as shown in FIG. 3, and supplies the image signals to a binarizing portion 32.

The binarizing portion 32 binarizes the respective image signals, and supplies them to head drivers 33L and 33D, which drive recording heads 9L and 9D. Thus, an image is recorded.

Details of FIG. 3 will be described below. If the input image signal (8 bits) takes one of the values 0–127 before the thick/thin sorting, only the image signal associated with the thin ink recording head 9L is outputted. The purpose of this is to represent optical density by recording many dots associated with thin ink, thereby preventing the individual dots from appearing, and improving the image quality.

On the other hand, when the input image signal takes one of the values 128–255 expressed in the 8-bit notation, the value of the image signal associated with the thin recording head 9L after the thick/thin sorting is reduced as the value of the input signal before the thick/thin sorting increases.

This is performed for the following reason. The Value of the image signal associated with the thick ink recording head 9D is increased in the range of 128–255 of the input signal value before sorting, so that the recording volume of the thick ink is increased to represent the optical density. In this case, unless the volume of the thin ink is decreased, the total ink volume will exceed an allowable ink volume of a recorded medium when a plurality of inks are deposited, thereby resulting in an overflow of the ink.

An image recording apparatus that achieves gradation by using a plurality of inks of different densities is disclosed in Japanese Patent Publication No. 14905/1990 (U.S. Pat. No. 4,635,078) assigned to the present assignee. This apparatus makes it possible to express gradation that could not be expressed by a single type of dots.

In such a color image recording apparatus, however, it is difficult to obtain N color materials of different densities of the same color family (such as thin cyan ink and thick cyan ink) in such a manner that their hues perfectly coincide with each other.

This presents a problem in that high color reproducibility of output images cannot be achieved when the color image recording apparatus, which performs a color masking process on the basis of the input image signal before the thick/thin sorting, is applied to a copying machine or the like.

Furthermore, since the conventional color ink jet recording apparatus obtains an image using a pair of thick and thin ink heads, a complete image cannot be obtained if one of the thick and thin ink heads is damaged.

SUMMARY OF THE INVENTION

In view of the above-described problems, an object of the present invention is to provide an improved color image forming apparatus and method.

Another object of the present invention is to provide a color image forming apparatus and method which is superior in color reproducibility, and can produce a high quality color image.

Still another object of the present invention is to provide a color image forming apparatus and method that can produce a complete image even if a recording head suffers a fault.

In a first aspect of the present invention, there is provided a color image forming apparatus comprising:

means for producing first image signals associated with a plurality of color families;

means for performing an image signal conversion processing which converts at least one of the first input image signals into N second image signals, N being an integer equal to or greater than two, and each of the N second image signals being associated with each one of N color materials which belong to the same color family and have different densities; and means for performing a color masking process on the basis of the second image signals obtained by the image signal conversion processing.

Here, the first image signals associated with a plurality of color families may comprise at least three image signals associated with cyan, magenta and yellow.

In a second aspect of the present invention, there is provided a color image forming apparatus having a plurality of sets of ink jet recording heads, each of the ink jet recording heads of the same set discharging in the form of fine droplets one of a plurality of recording materials which belong to the same color family and have different densities, the color image forming apparatus comprising:

- detecting means for detecting a failure of the ink jet recording heads;
- selecting means for selecting one of predetermined recording modes of the ink jet recording heads in response to a detection signal outputted from the detecting means; and
- control means for changing a recording density on a recorded medium in accordance with the recording mode selected by the selecting means.

Here, the control means may comprise means for changing a relative speed between the ink jet recording heads and the recorded medium.

The control means may comprise means for changing a driving frequency of the ink jet recording heads.

The control means may further comprise means for changing a driving frequency of the ink jet recording heads.

Each of the ink jet recording heads may comprise electrothermal converting elements that generate thermal energy which causes a film boiling in the recording material, the thermal energy being used to discharge the recording material.

The color image forming apparatus may further comprise a plurality of sets of ink jet recording heads, each of the ink jet recording heads of the same set discharging in the form of fine droplets one of a plurality of recording materials which belong to the same color family and have different densities.

Each of the ink jet recording heads may comprise electrothermal converting elements that generate thermal energy which causes a film boiling in the recording material, the thermal energy being used to discharge the recording material.

The color image forming apparatus may further comprise a plurality of sets of ink jet recording heads, each of the plurality of sets being associated with each one of the cyan, magenta and yellow, and each of the ink jet recording heads of the same set discharging in the form of fine droplets one of a plurality of recording materials which belong to the same color family and have different densities.

Each of the ink jet recording heads may comprise electrothermal converting elements that generate thermal energy which arises a film boiling in the recording material, the thermal energy being used to discharge the recording material.

The means for performing an image signal conversion processing may separate the first image signals associated with cyan, magenta and yellow into the second image signals associated with thick cyan and thin cyan, thick magenta and thin magenta, and thick yellow and thin yellow, respectively.

The means for performing a color masking process may comprise means for performing a first-order conversion of the second image signals.

The means for performing a color masking process may comprise means for performing a second-order conversion of the second image signals.

The color image forming apparatus may further comprise means for generating a black image signal on the basis of the three first image signals, wherein the means for performing an image signal conversion processing converts the first image signals and the black image signal into eight second image signals associated with thick cyan, thin cyan, thick magenta, thin magenta, thick yellow, thin yellow, thick black and thin black, respectively, and wherein the means for performing a color masking process comprises means for performing a first-order conversion of the eight second image signals.

In a third aspect of the present invention, there is provided a color image forming apparatus having a plurality of sets of ink jet recording heads, each of the ink jet recording heads of the same set discharging in the form of fine droplets one of a plurality of color materials which belong to the same color family and have different densities, the color image forming apparatus comprising:

- means for producing first image signals, each of which is associated with one of the plurality of color families;
- image converting means for converting at least one of the first input image signals into N second image signals, N being an integer equal to or greater than two, and each of the N second image signals being associated with each one of N color materials which belong to the same color family and have different densities;
- detecting means for detecting a failure of the ink jet recording heads;
- mode selecting means for selecting one of predetermined recording modes of the ink jet recording heads in response to a detection signal outputted from the detecting means; and
- control means for changing a recording density on a recorded medium in accordance with the recording mode selected by the mode selecting means.

The ink jet recording heads of the same set may comprise a thick ink jet recording head associated with thick ink of the same color family, and a thin ink jet recording head associated with thin ink of the same color family, and wherein the recording modes of the recording heads include a thick and thin both ink head use mode, a thick ink head exclusive use mode, and a thin ink head exclusive use mode.

The image converting means may comprise a plurality of thick/thin sorting tables, each of the tables being associated with each one of the recording modes, and storing predetermined conversion characteristics which are used to convert the first image signals into the second image signals.

The control means may comprise means for changing a relative speed between the ink jet recording heads and the recorded medium.

The control means may comprise means for changing a driving frequency of the ink jet recording heads.

The control means may further comprise means for changing a driving frequency of the ink jet recording heads.

Each of the ink jet recording heads may comprise electrothermal converting elements that generate thermal energy which causes a film boiling in the recording material, the thermal energy being used to discharge the recording material.

Each of the ink jet recording heads may be a binary type ink jet recording head that either performs discharging or stops discharging of the color material in response to a second image signal.

Each of the ink jet recording heads may be a dot modulation type ink jet recording head that modulates a discharging volume of the color material in response to the second image signal.

The ink jet recording heads may be a bidirectional type ink jet recording head which performs recording while moving back and forth across a recorded medium.

In a fourth aspect of the present invention, there is provided a color image forming method comprising the steps of:

producing first image signals associated with a plurality of color families;

performing an image signal conversion processing which converts at least one of the first input image signals into N second image signals, N being an integer equal to or greater than two, and each of the N second image signals being associated with each one of N color materials which belong to the same color family and have different densities; and performing a color masking process on the basis of the second image signals obtained by the image signal conversion processing.

Here, the first image signals associated with a plurality of color families may comprise at least three image signals associated with cyan, magenta and yellow.

In a fifth aspect of the present invention, there is provided a color image forming method applied to an apparatus having a plurality of sets of ink jet recording heads, each of the ink jet recording heads of the same set discharging in the form of fine droplets one of a plurality of recording materials which belong to the same color family and have different densities, the color image forming method comprising the steps of:

detecting a failure of the ink jet recording heads;

selecting one of predetermined recording modes of the ink jet recording heads in response to a detection signal outputted from the detecting means; and changing a recording density on a recorded medium in accordance with the recording mode selected by the selecting means.

Here, the step of changing a recording density may comprise a step of changing a relative speed between the ink jet recording heads and the recorded medium.

The step of changing a recording density may comprise a step of changing a driving frequency of the ink jet recording heads.

The step of changing recording density may comprise a step of changing a driving frequency of the ink jet recording heads.

Each of the ink jet recording heads may comprise electrothermal converting elements that generate thermal energy which causes a film boiling in the recording material, the thermal energy being used to discharge the recording material.

The step of performing an image signal conversion processing may comprise a step of separating the first image signals associated with cyan, magenta and yellow into the second image signals associated with thick cyan and thin cyan, thick magenta and thin magenta, and thick yellow and thin yellow, respectively.

The step of performing a color masking process may comprise a step of performing a first-order conversion of the second image signals.

The step of performing a color masking process may comprise the step of performing a second-order conversion of the second image signals.

The color image forming method may further comprises the step of generating a black image signal on the basis of the three first image signals, wherein the step of performing an image signal conversion processing comprises the step of converting the first image signals and the black image signal into eight second image signals associated with thick cyan, thin cyan, thick magenta, thin magenta, thick yellow, thin yellow, thick black and thin black, respectively, and wherein the step of performing a color masking process comprises the step of performing a first-order conversion of the eight second image signals.

In a sixth aspect of the present invention, there is provided a color image forming method applied to an apparatus having a plurality of sets of ink jet recording heads, each of the ink jet recording heads of the same set discharging in the form of fine droplets one of a plurality of color materials which belong to the same color family and have different densities, the color image forming method comprising the steps of:

producing first image signals, each of which is associated with one of the plurality of color families;

converting at least one of the first input image signals into N second image signals, N being an integer equal to or greater than two, and each of the N second image signals being associated with each one of N color materials which belong to the same color family and have different densities;

detecting a failure of the ink jet recording heads and outputting a detection signal;

selecting one of predetermined recording modes of the ink jet recording heads in response to the detection signal; and changing a recording density on a recorded medium in accordance with the recording mode selected.

Here, the ink jet recording heads of the same set may comprise a thick ink jet recording head associated with thick ink of the same color family, and a thin ink jet recording head associated with thin ink of the same color family, and wherein the recording modes of the recording heads comprise a thick and thin ink head dual use mode, a thick ink head exclusive use mode, and a thin ink head exclusive use mode.

The step of converting may comprise the step of selecting one of a plurality of thick/thin sorting tables, each of the tables being associated with each one of the recording modes, and storing predetermined conversion characteristics which are used to convert the first image signals into the second image signals.

The step of changing a recording density may comprise the step of changing a relative speed between the ink jet recording heads and the recorded medium.

The step of changing a recording density may comprise the step of changing a driving frequency of the ink jet recording heads.

The step of changing a recording density may comprise the step of changing a driving frequency of the ink jet recording heads.

Each of the ink jet recording heads may comprise electrothermal converting elements that generate thermal energy which causes a film boiling in the recording material, the thermal energy being used to discharge the recording material.

Each of the ink jet recording heads may be a binary type ink jet recording head that either performs discharging or stops discharging of the color material in response to a second image signal.

Each of the ink jet recording heads may be a dot modulation type ink jet recording head that modulates a discharging volume of the color material in response to the second image signal.

The ink jet recording heads each may be a bidirectional type ink jet recording head which performs recording while moving back and forth across a recorded medium.

According to one aspect of the present invention, a color masking process is performed on the basis of image signals after the thick/thin sorting. This makes it possible to produce a high quality output image with high reproducibility, even if the hues of N color materials of different density, which belong to the same color family, such as thin cyan ink and thick cyan ink, are different to some extent.

According to another aspect of the present invention, a system is designed so that if the thick ink recording head or the thin ink recording head fails, the remaining head compensates for the failure by changing the print mode. This makes it possible to continue a printing operation even if one of the thick and thin ink recording heads fails, thereby achieving highly reliable image recording.

The above and other objects, effects, features and advantages of the present invention will become more apparent from the following description of the embodiments thereof taken in conjunction with the accompanying drawings.

DETAILED DESCRIPTION OF PREFERRED EMBODIMENTS

The invention will now be described with reference to the accompanying drawings. In the following embodiments, since the mechanical structure of an ink jet recording apparatus is the same as that of FIG. 1, description thereof will be omitted.

EMBODIMENT 1

In a first embodiment, a color image processing apparatus, which inputs three image signals associated with three colors of cyan, magenta, and yellow, and which outputs six image signals associated with six color materials of thin cyan ink, thick cyan ink, thin magenta ink, thick magenta ink, thin yellow ink, and thick yellow ink, will be described.

Figure 3:
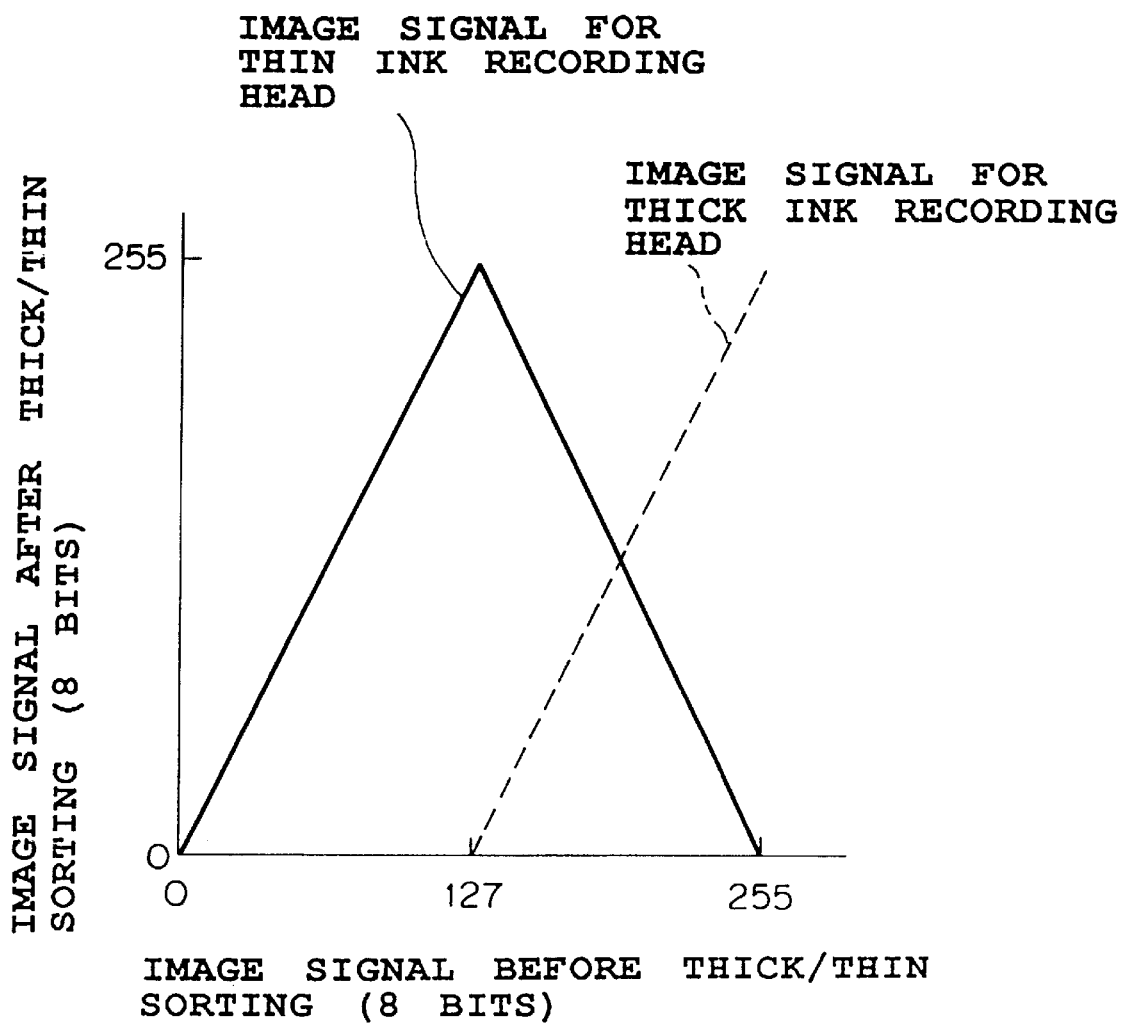
FIG. 3 is a graph illustrating the characteristics of a thick/thin sorting table associated with embodiments in accordance with the present invention.
Figure 4:
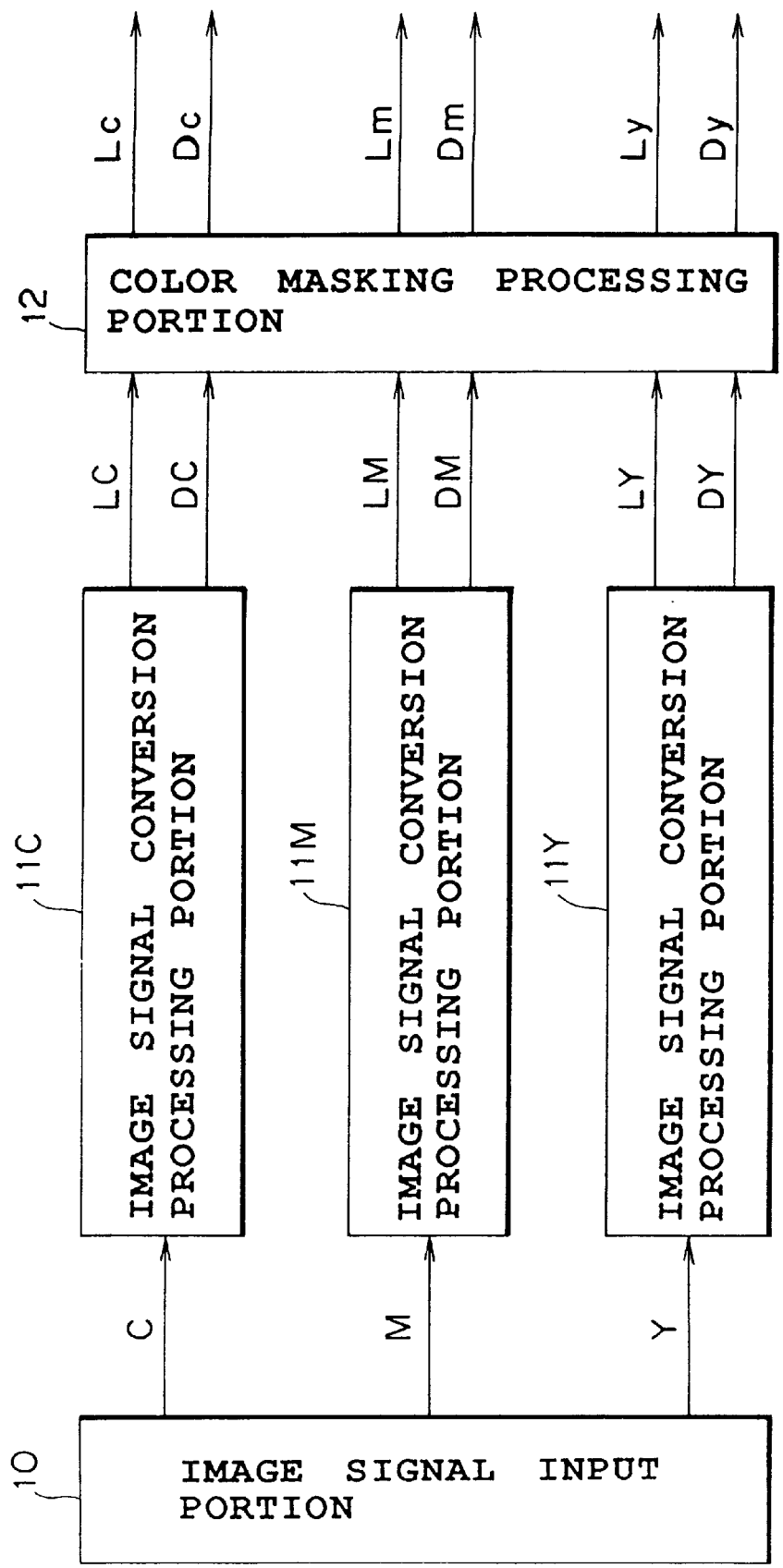
FIG. 4 is a block diagram showing the image signal processing portion of first and second embodiments of a color image forming apparatus in accordance with the present invention.

FIG. 4 shows a block diagram of the first embodiment. In this figure, image signals C, M and Y, which are associated with three colors of cyan, magenta and yellow, are supplied from an image signal input portion 10 to image signal conversion processing portions 11C, 11M and 11Y. The image signal conversion processing portions 11C, 11M and 11Y convert the image signals C, M and Y into six image signals LC (thin cyan), DC (thick cyan), LM (thin magenta), DM (thick magenta), LY (thin yellow) and DY (thick yellow) by using thick/thin sorting tables having characteristics as shown in FIG. 3, for example.

Subsequently, a color masking processing portion 12 carries out a color masking process in accordance with the following equation (1), and outputs six image signals Lc (thin cyan), Dc (thick cyan), Lm (thin magenta), Dm (thick magenta), Ly (thin yellow) and Dy (thick yellow).

$$\begin{pmatrix} L_c \\ D_c \\ L_m \\ D_m \\ L_y \\ D_y \end{pmatrix} = \begin{pmatrix} a_{11} & a_{12} & a_{13} & a_{14} & a_{15} & a_{16} \\ a_{21} & a_{22} & a_{23} & a_{24} & a_{25} & a_{26} \\ a_{31} & a_{32} & a_{33} & a_{34} & a_{35} & a_{36} \\ a_{41} & a_{42} & a_{43} & a_{44} & a_{45} & a_{46} \\ a_{51} & a_{52} & a_{53} & a_{54} & a_{55} & a_{56} \\ a_{61} & a_{62} & a_{63} & a_{64} & a_{65} & a_{66} \end{pmatrix} \begin{pmatrix} LC \\ DC \\ LM \\ DM \\ LY \\ DY \end{pmatrix} \quad (1)$$

($a_{ij}$: $i, j = 1, 2, 3, 4, 5, 6$, are coefficients)

A black generation process, a UCR (Under Color Removal) process, and a black printing process are performed in accordance with the six image signals in this manner, and then a binarization process is performed.

Figure 1:
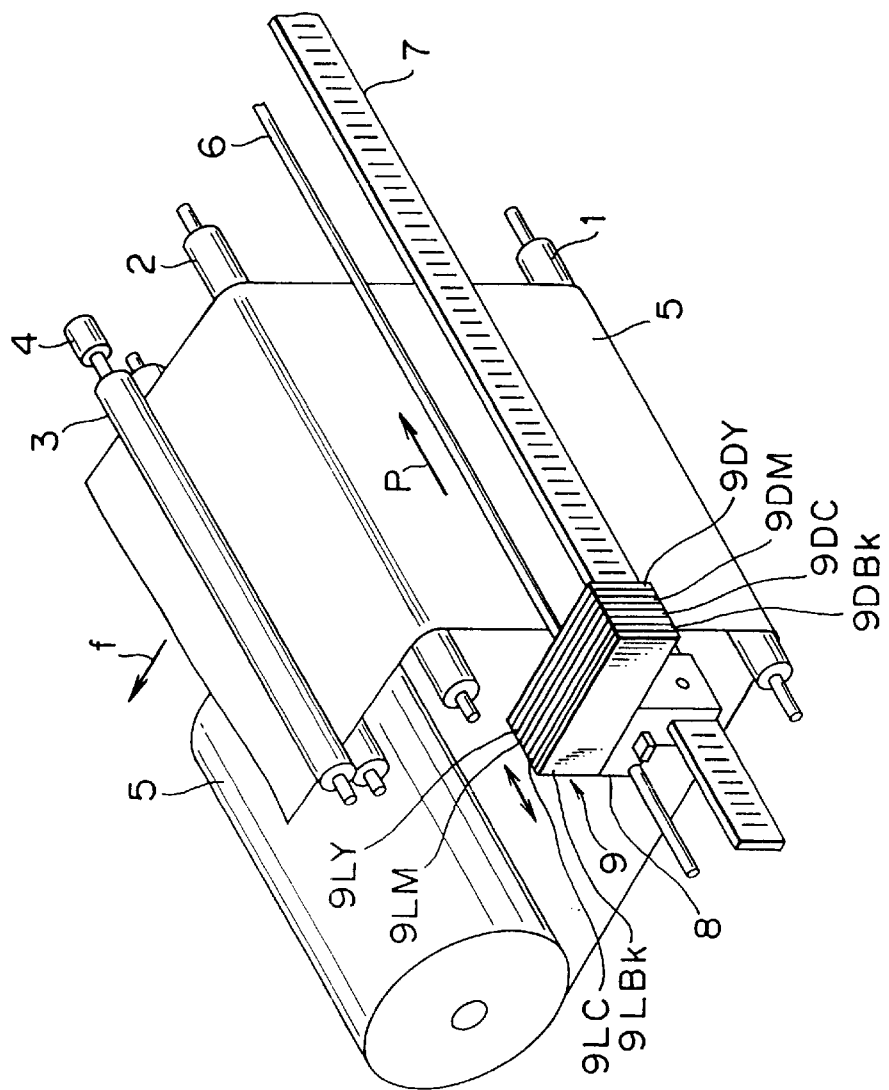
FIG. 1 is a perspective view showing a color ink jet recording apparatus, to which the present invention is applied preferably.
Figure 2:
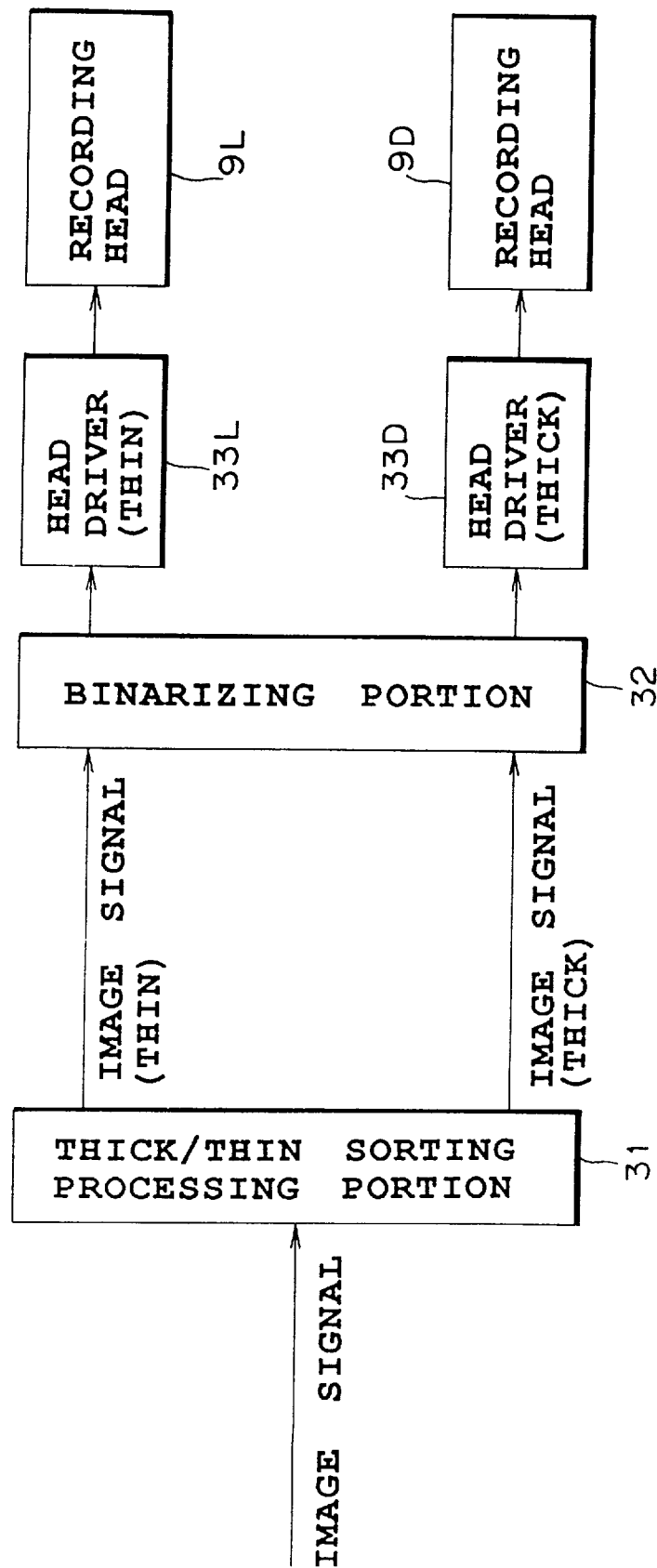
FIG. 2 is a block diagram showing a signal processing system for a conventional color recording apparatus.

By applying the color image processing apparatus in accordance with the first embodiment to a color image recording apparatus as shown in FIG. 1 used as a copying machine, high quality output images that reproduce colors of original documents with high fidelity are obtained.

EMBODIMENT 2

The color masking process of the first embodiment is a first order color masking process as shown by equation (1). A second embodiment performs a second order color masking process in order to further improve color reproducibility.

The block diagram of this embodiment is the same as that of the first embodiment. The second embodiment differs from the first embodiment in the color masking process by the color masking processing portion 12. The color masking process of this embodiment is carried out in accordance with the following equation (2).

$$\begin{pmatrix} L_c \\ D_c \\ L_m \\ D_m \\ L_y \\ D_y \end{pmatrix} = \begin{pmatrix} b_{1,1} & b_{1,2} & b_{1,3} & \cdots & b_{1,17} & b_{1,18} \\ b_{2,1} & b_{2,2} & \cdots & \cdots & \cdots & b_{2,18} \\ b_{3,1} & \cdots & \cdots & \cdots & \cdots & b_{3,18} \\ b_{4,1} & & & & & b_{4,18} \\ b_{5,1} & & & & & b_{5,18} \\ b_{6,1} & \cdots & \cdots & \cdots & \cdots & b_{6,18} \end{pmatrix} \begin{pmatrix} LC \\ DC \\ LM \\ DM \\ LY \\ DY \\ LC \times LM \\ LC \times DM \\ LC \times LY \\ LC \times DY \\ DC \times LM \\ DC \times DM \\ DC \times LY \\ DC \times DY \\ LM \times LY \\ LM \times DY \\ DM \times LY \\ DM \times DY \end{pmatrix} \quad (2)$$

($b_{i,j}$: $i = 1, 2 \cdots 6$   $j = 1, 2 \cdots 18$ are coefficients)

A black generation process, a UCR process and a black printing process are performed in accordance with the six signals obtained by the color masking process in accordance with equation (2), and then a binarization process is performed. By applying the color image processing apparatus in accordance with the second embodiment to a color image recording apparatus as shown in FIG. 1 used as a copying machine, high quality output images that reproduce colors of original documents with higher fidelity than the first embodiment are obtained.

EMBODIMENT 3

Figure 5:
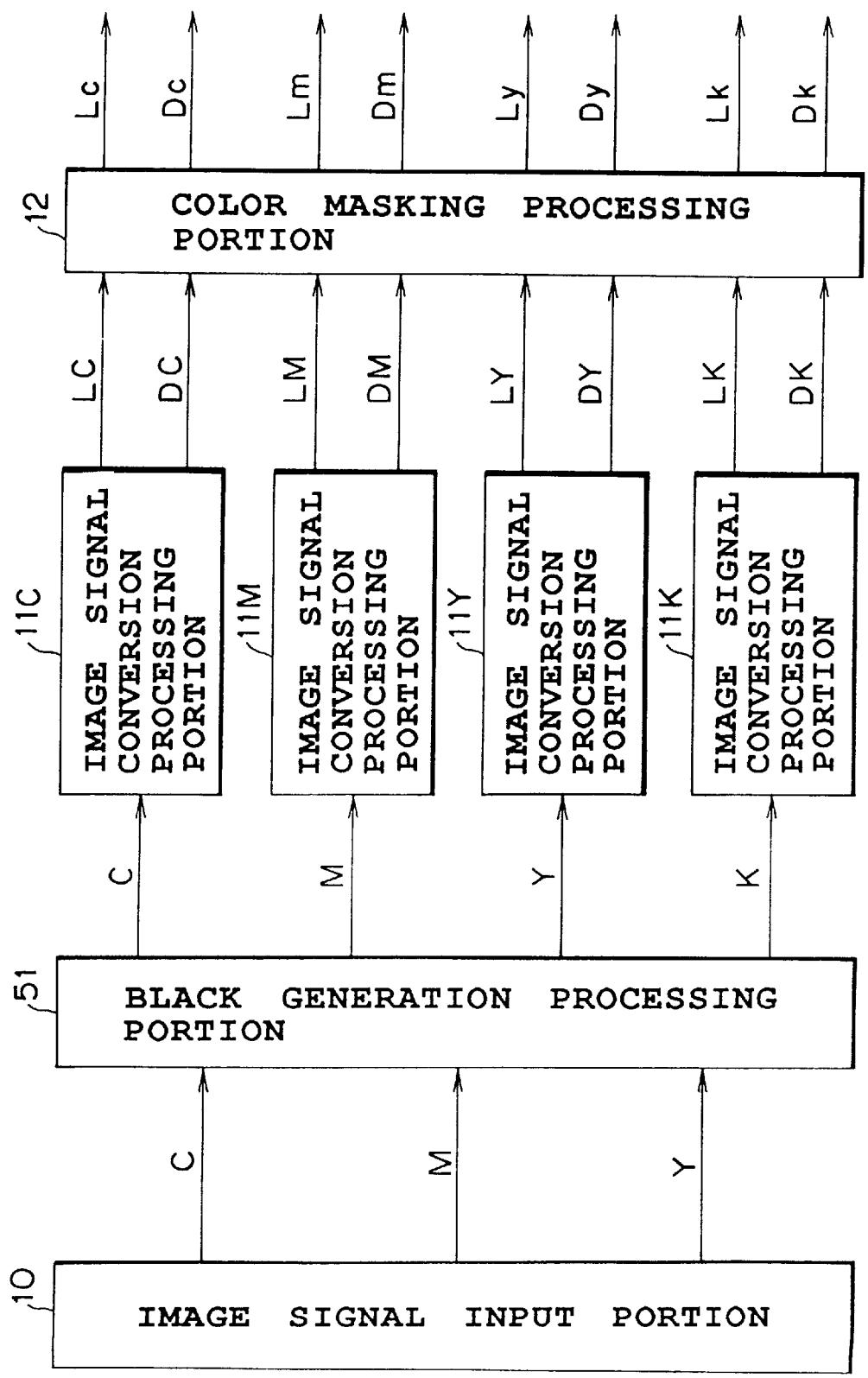
FIG. 5 is a block diagram showing the image signal processing portion of a third embodiment of a color image forming apparatus in accordance with the present invention.

FIG. 5 shows a block diagram of a third embodiment. In this figure, the same reference numerals designate the like portions in FIG. 4.

In FIG. 5, the image signals C, M and Y, which are associated with three colors, cyan, magenta and yellow, and are outputted from the image signal input portion 10, are supplied to a black generation processing portion 51. The black generation processing portion 51 performs a black generation process in accordance with the following equation (3).

$$K = \min(C, M, Y) \quad (3)$$

Subsequently, image signal conversion processings are performed in accordance with the image signals C, M, Y and K produced from the black generation processing portion 51 as in the first embodiment. These conversion processings are carried out by image signal conversion processing portions 11C, 11M, 11Y and 11K, which produce eight image signals LC, DC, LM, DM, LY, DY, LK and DK. After that, the color masking processing portion 12 performs a color masking process on the eight image signals LC, DC, LM, DM, LY, DY, LK and DK in accordance with the following equation (4).

$$\begin{pmatrix} L_c \\ D_c \\ L_m \\ D_m \\ L_y \\ D_y \\ L_k \\ D_k \end{pmatrix} = \begin{pmatrix} d_{11} & d_{12} & d_{13} & d_{14} & d_{15} & d_{16} & d_{17} & d_{18} \\ d_{21} & d_{22} & d_{23} & d_{24} & d_{25} & \cdots & \cdots & d_{28} \\ d_{31} & d_{32} & d_{33} & d_{34} & \cdots & \cdots & \cdots & d_{38} \\ d_{41} & d_{42} & d_{43} & \cdots & \cdots & \cdots & \cdots & d_{48} \\ d_{51} & d_{52} & \cdots & \cdots & \cdots & \cdots & \cdots & d_{58} \\ d_{61} & \cdots & \cdots & \cdots & \cdots & \cdots & \cdots & d_{68} \\ d_{71} & & & & & & & d_{78} \\ d_{81} & & & & & & & d_{88} \end{pmatrix} \begin{pmatrix} LC \\ DC \\ LM \\ DM \\ LY \\ DY \\ LK \\ DK \end{pmatrix} \quad (4)$$

($d_{ij}$: $i, j = 1, 2, \cdots 8$ are coefficients)

The eight image signals Lc, Dc, Lm, Dm, Ly, Dy, Lk and Dk generated by the color masking process in accordance with equation (4) including processings corresponding to the UCR process, and the black printing process, are subject to a binarization process. By applying the color image processing apparatus in accordance with the third embodiment to a color image recording apparatus as shown in FIG. 1 used as a copying machine, high quality output images that reproduce colors of original documents with high fidelity are obtained.

Although the number of the image signals after the thick/thin sorting is two, which are associated with thin ink and thick ink, for each of the colors in the first to third embodiments described above, the number can be increased to more than two.

In addition, the number of image signals supplied from the image signal input portion can be increased to more than three provided they include at least three image signals associated with cyan, magenta and yellow.

Furthermore, the thick/thin sorting process need not be performed for all the input image signals. For example, a single color material may be enough for a color like yellow, in which dots are not visually conspicuous.

EMBODIMENT 4

Figure 6:
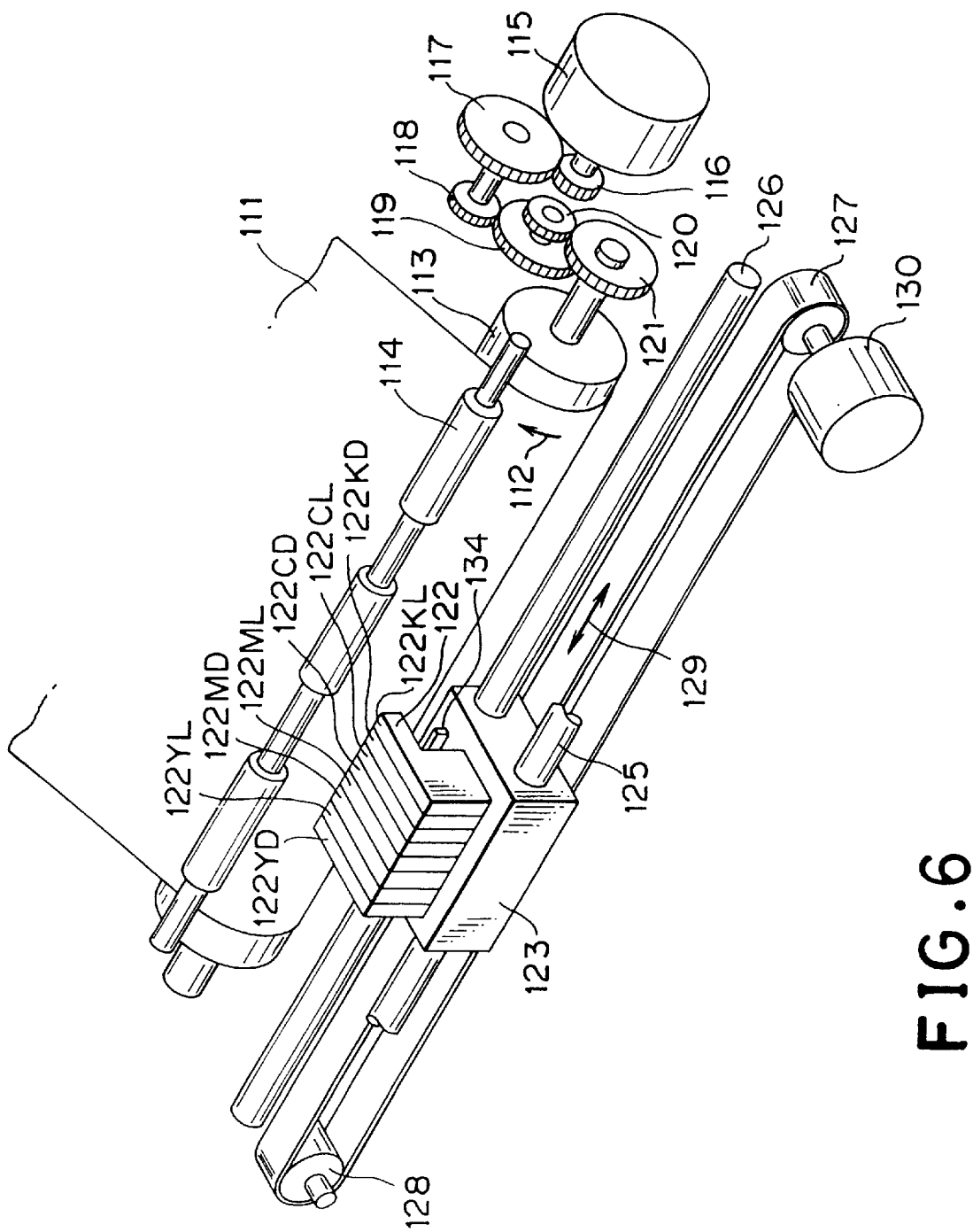
FIG. 6 is a perspective view of a fourth embodiment of an ink jet recording apparatus in accordance with the present invention.

FIG. 6 is a perspective view showing a recording portion of an ink jet printer to which the present invention is applied. In this figure, the reference numeral 111 denotes recorded paper as a recorded medium. The recorded paper 111 is transported in the direction of the arrow 112 with a pinch roller 114 and a platen 113, on which image recording is carried out. The driving power of a paper incrementing motor 115 is transmitted to the platen 113 via gears 116–121, thereby rotating the platen 113.

The reference numeral 122 designates a head unit mounted on a carriage 123. The head unit includes heads 122YD, 122YL, 122MD, 122ML, 122CD, 122CL, 122KD and 122KL, which discharge thick and thin inks of yellow, magenta, cyan and black, respectively.

Next, the discharge principle of the ink jet recording heads used in the apparatus of the present embodiment will be described below.

A recording head used in an ink jet recording apparatus generally comprises very fine liquid discharging openings (orifices), liquid passages, energy acting portions each of which is provided at a part of each liquid passage, and energy generating means each of which is provided for generating droplet forming energy that effects on the liquid at each energy acting portion.

The energy generating means for generating such energy are provided in one of the following forms: an electromechanical transducer like a piezoelectric device; a device for irradiating electromagnetic waves like laser waves on the liquid to develop heat in the liquid by absorption, thereby discharging and ejecting droplets of the liquid; and an electrothermal converting element that heats the liquid to be discharged.

In particular, the recording heads used in the ink jet recording apparatus that discharges liquid by thermal energy makes high resolution recording possible. This is because the liquid discharging openings (orifices), which discharge droplets to form ejection droplets for recording, can be arrayed at a high density. In addition, the recording heads that employ the electrothermal converting elements as energy generating means can be formed into a compact unit. Furthermore, since IC technique and micro-processing technique, which have recently been exhibiting remarkable progress in technique and improvement in reliability in the semiconductor field, can be fully exploited, long, two-dimensional recording heads can be easily fabricated. This makes it possible to implement multi-nozzle/high-density recording heads, and to mass-produce low cost ink jet recording heads with high productivity.

The ink jet recording heads, which employ electrothermal converting elements as energy generating means, and are produced through semiconductor fabricating processes, generally have a structure including the following elements: ink discharging openings; liquid passages, each associated with each ink discharging opening; electrothermal converting elements, each of which is provided in each liquid passage, and exerts thermal energy on the liquid filled in the liquid passage to discharge liquid from the corresponding ink discharging opening, thereby forming flying droplets; and a common liquid chamber communicating with individual liquid passages, and supplying liquid thereto.

With regard to a fabricating method of the ink discharging portion, the assignee of the present application has proposed a method in Japanese Patent Application Laying-Open No. 253457 (1987) (U.S. Pat. No. 5,030,317). The outline of the method is as follows: First, a solid layer in which at least liquid passages are to be formed, an active energy ray setting material layer to be used to form at least walls of the liquid passages, and a second substrate are sequentially stacked on a first substrate. Second, a mask is deposited on the second substrate, and active energy rays are irradiated on top of the mask. Thus, at least portions corresponding to walls of the liquid passages are cured in the active energy ray setting material layer. Subsequently, non-cured portions of the solid layer and the active energy ray setting material layer are removed from between the two substrates, thereby forming liquid passages.

Figure 7:
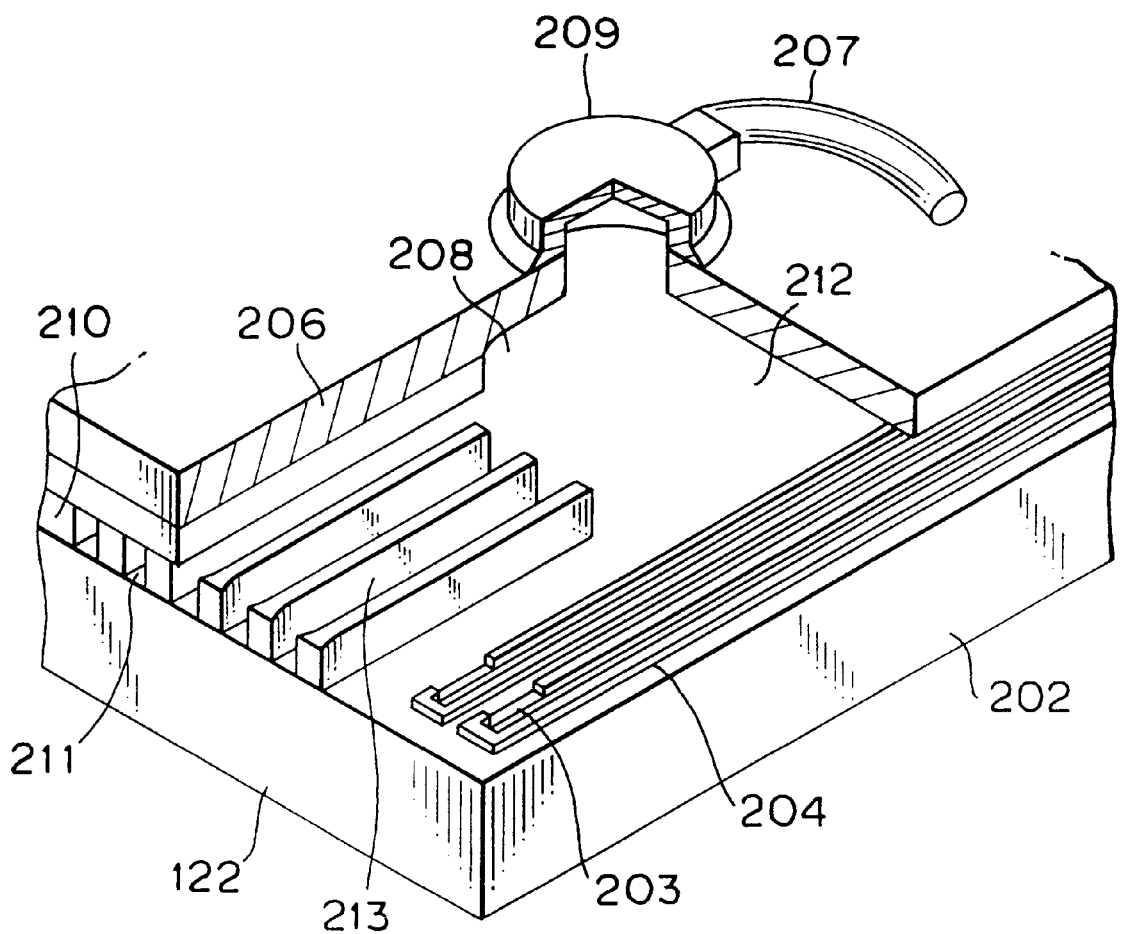
FIG. 7 is a perspective view of a recording head used in the embodiments in accordance with the present invention.

FIG. 7 schematically illustrates an ink jet recording head. As will be clearly seen from this figure, the recording head 122 is composed of electrothermal converting elements 203 made on a substrate 202 (the first substrate) by a film formation process, electrodes 204, an active energy ray setting material layer 210 which has been cured to form liquid passages 213, and a ceiling plate 206.

In the recording head 122, a recording liquid 212 is supplied from a liquid reservoir (not seen) to a common liquid chamber 208 through a liquid supply tube 207 which is joined to a liquid supply tube connector 209. Capillary forces cause the liquid passages 213 to refill with the liquid 212 from the common liquid chamber 208. Thus, the liquid 212 is stably maintained at the tip of each liquid passage, that is, the ink discharging orifice 211, with forming a meniscus. Each electrothermal converting element 203, when supplied with electric current, heats a small portion of the liquid thereon, thereby generating a bubbling phenomenon. Bubbles give momentum to the liquid, thereby causing droplets of the liquid to be propelled from the discharge orifices 211. This arrangement makes it possible to implement a multi-nozzle ink jet recording head which has a high liquid passage density, thereby realizing a discharging orifice density of 400 DPI (Dots Per Inch).

Figure 8:
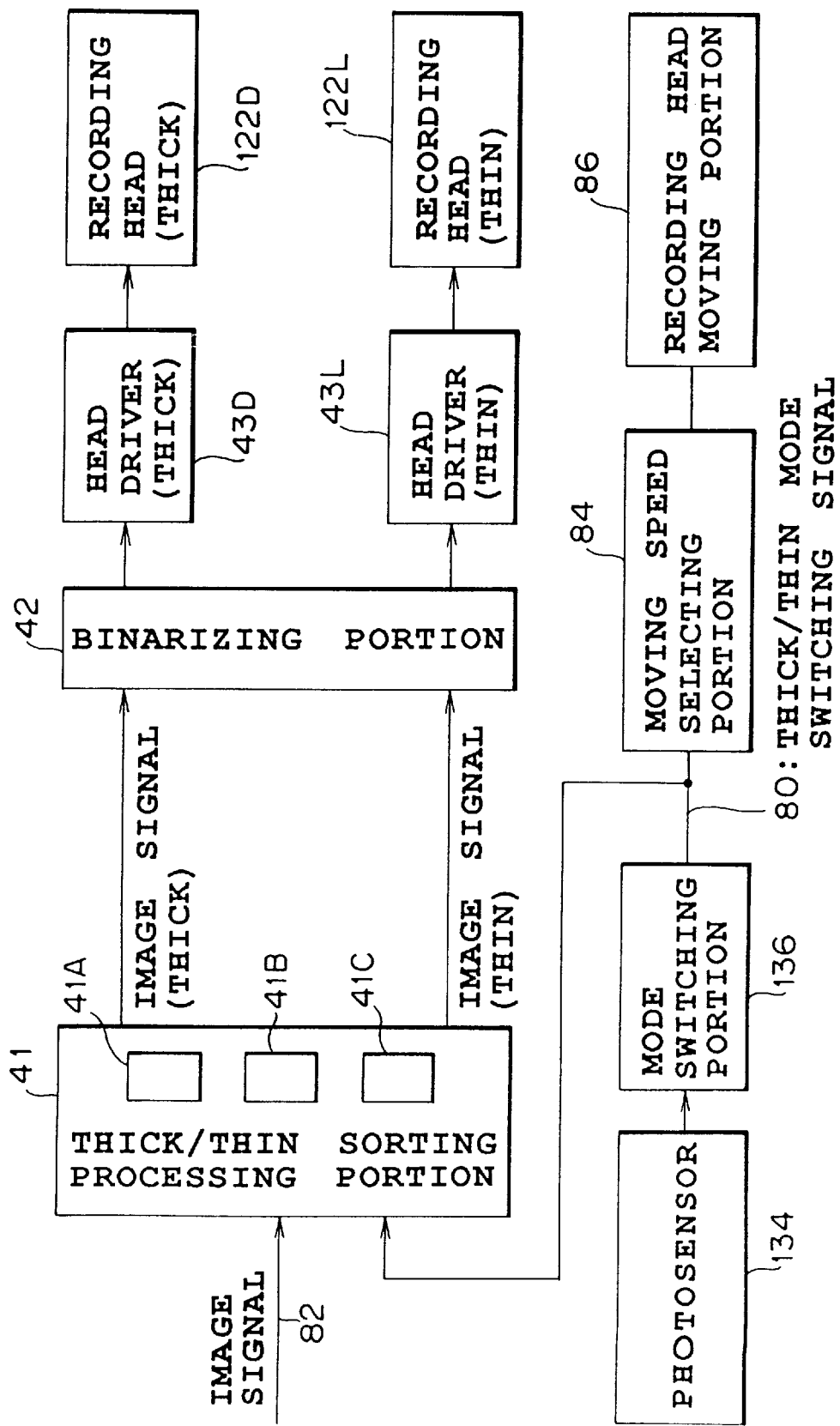
FIG. 8 is a block diagram illustrating the thick/thin sorting process in the fourth embodiment.

FIG. 8 is a block diagram illustrating an example of a thick/thin sorting processing portion associated with a pair of thick/thin recording heads. Here, it is assumed that the dye density of the thick ink is about twice that of the thin ink.

In FIG. 8, the reference numeral 134 designates a photosensor, such as a CCD array, which is provided on a carriage 123 of the ink jet recording apparatus as shown in FIG. 6, for detecting defective dots. The detection signal produced by the photosensor 134 is supplied to a mode switching portion 136. The mode switching portion 136 produces a thick/thin mode switching signal 80 that designates a mode of the ink jet recording heads in accordance with a failure thereof. For example, when the thick and thin ink recording heads 122D and 122L are both normal, the mode switching signal 80 designates a thick and thin ink head dual use mode. On the other hand, if the thin ink recording head falls into a failure, the mode switching signal 80 designates a thick ink recording head exclusive use mode, whereas if the thick ink recording head falls into a failure, the mode switching signal 80 designates a thin ink recording head exclusive use mode.

Figure 9A:
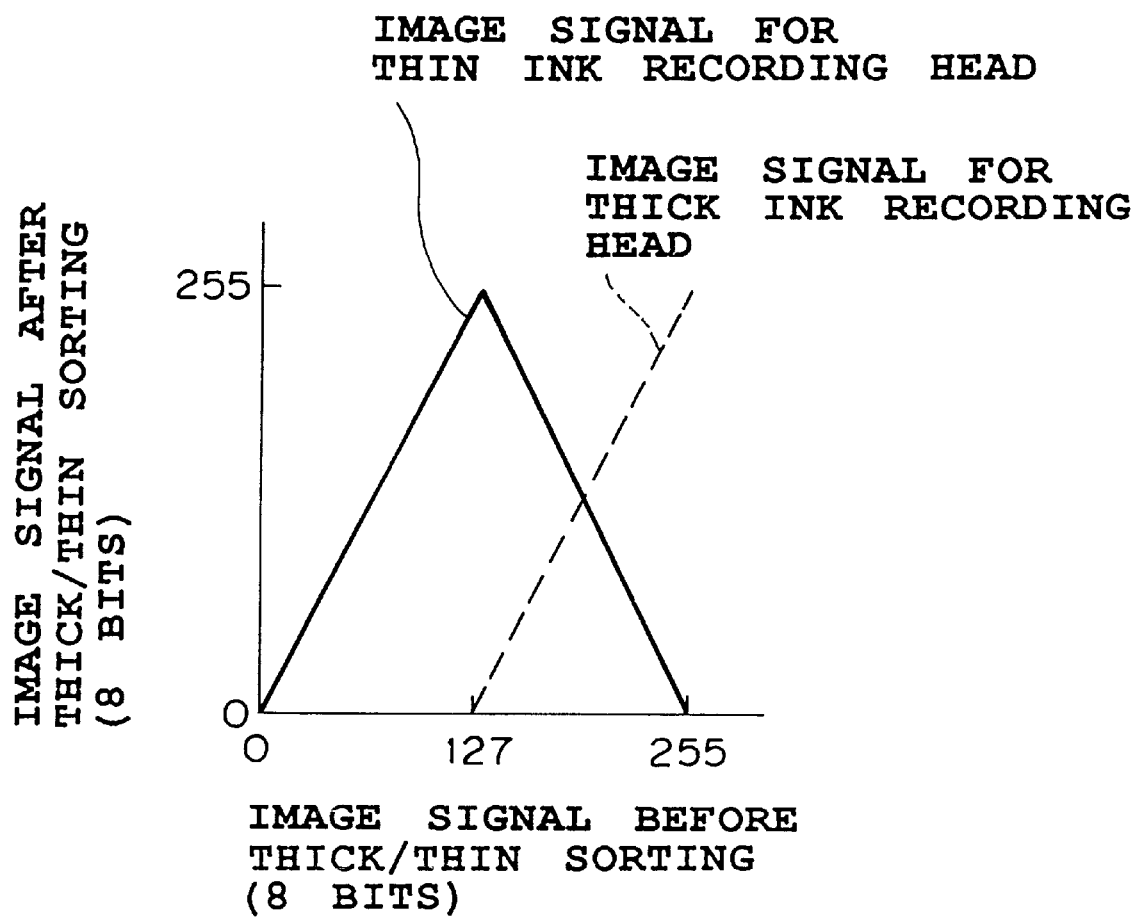
FIGS. 9A–9C are graphs illustrating the characteristics of the thick/thin sorting tables in FIG. 8.
Figure 9B:
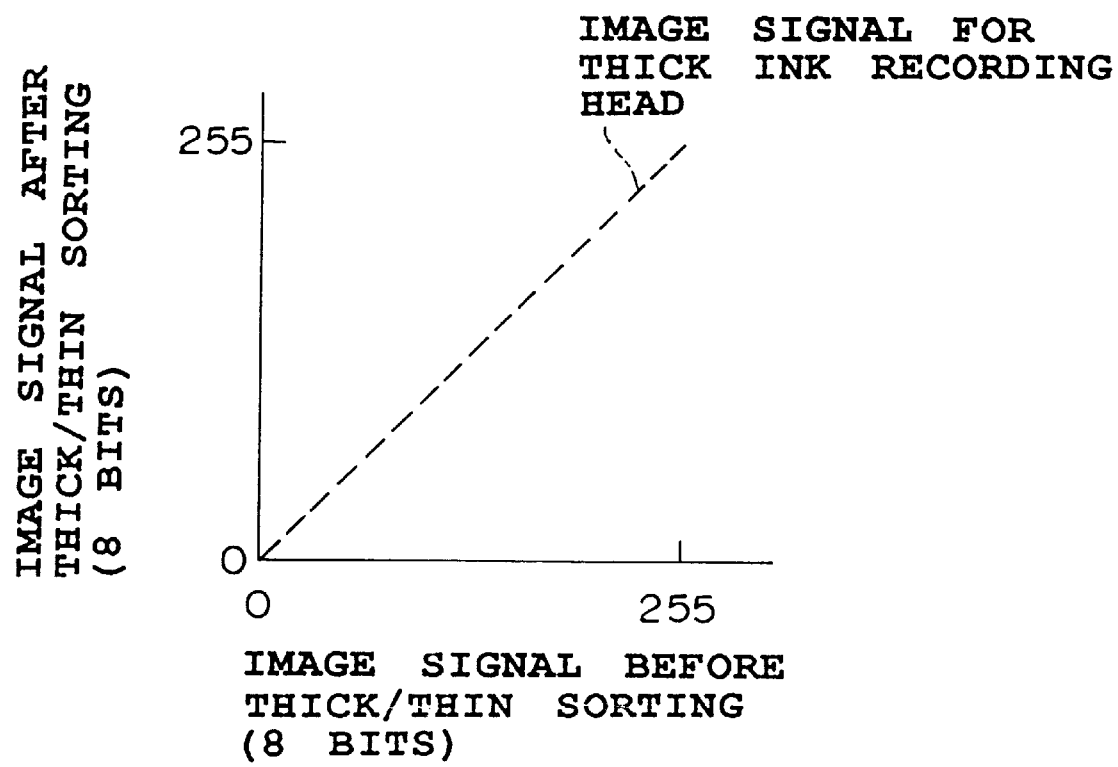
Figure 9C:
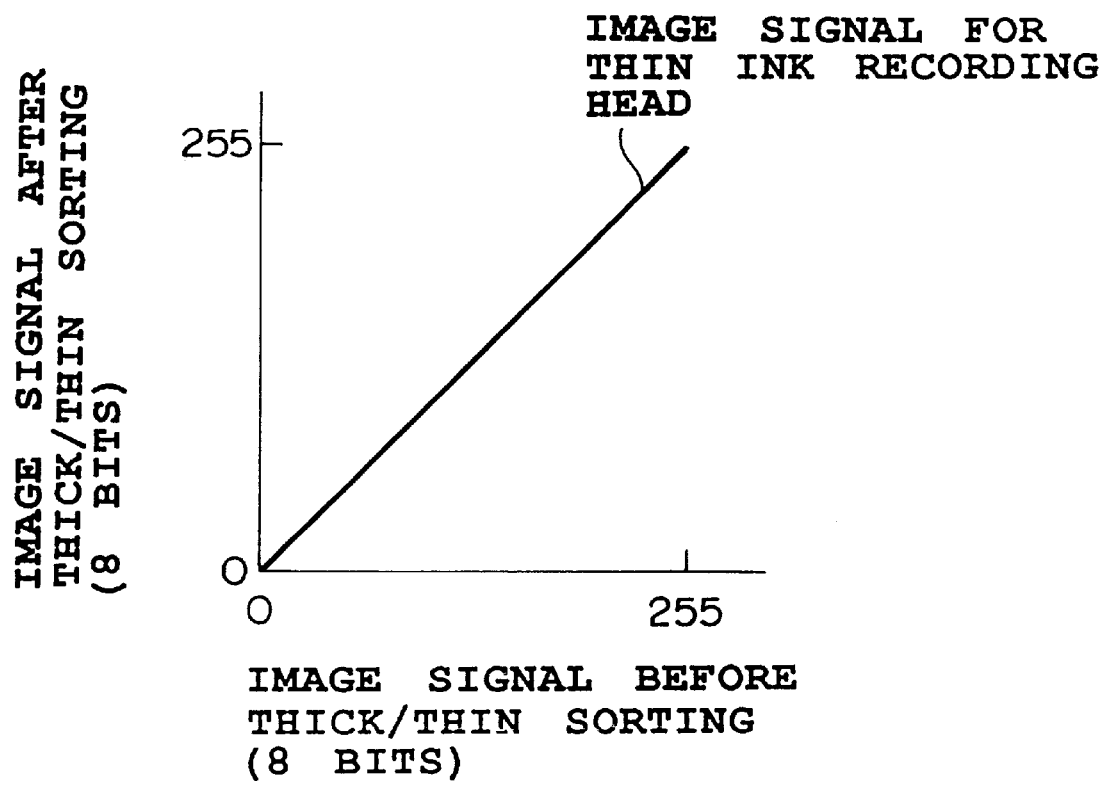

The thick/thin mode switching signal 80 is supplied to a thick/thin sorting processing portion 41, and a moving speed selecting portion 84. The thick/thin sorting processing portion 41 includes three thick/thin sorting tables 41A–41C whose characteristics are shown in FIGS. 9A–9C, and changes the table to be used in accordance with the mode switching signal 80. The moving speed selecting portion 84 produces a signal for changing the moving speed of the recording heads in accordance with the mode switching signal 80, and supplies the signal to a recording head moving portion 86.

Next, the operation of the fourth embodiment will be described.

In a normal mode, where the thick/thin mode switching signal 80 designates the thick and thin ink head dual use mode, the thick/thin sorting portion 41 selects the thick/thin sorting table 41A, whose characteristics are preset as shown in FIG. 9A. The thick/thin sorting portion 41 separates an image signal 82 into a thick ink image signal and a thin ink image signal by using the table 41A, and sends them to a binarizing portion 42.

The binarizing portion 42 binarizes the thick ink image signal and the thin ink image signal, and supplies the binarized signals to head drivers 43D and 43L, respectively. The head drivers 43D and 43L drive the recording heads 122D and 122L, respectively, thus performing image recording.

The thick/thin sorting table as shown in FIG. 9A is selected for the following reason.

In highlight portions, only dots associated with thin ink are formed so that individual dots become inconspicuous, and graininess of the highlight portions is reduced. When the thin ink dots are filled to a highest level at a particular image signal level, thick ink dots are added for the image signal beyond that level. In this case, thin ink dots are reduced at positions where thick ink dots are formed. The moving speed $V_1$ of the recording heads in the thick/thin ink heads dual use mode is determined as follows:

To obtain images whose printed density in the moving direction of the recording head (that is, in the direction of the arrow 129) is 400 DPI by driving 400 DPI recording heads at 4 kHz, the moving speed $V_1$ of the recording head is given by the following equation:

$$V_1 = 4000 \text{ (dots/sec)}/400 \text{(dots/inch)} = 10 \text{inch/sec} \tag{5}$$

Next, a thick ink head exclusive use mode, a recording mode when the thin ink head fails, will be described.

A failure of the thin ink head can be detected by performing a test printing of singular dots to be detected on a recording medium, and then by determining whether the photosensor 134 reads those dots correctly.

If the thin ink head failure is detected, the thick/thin mode switching signal 80 of FIG. 8 is changed to the thick ink head exclusive use mode. In this case, the thick/thin sorting portion 41 selects the thick/thin sorting table 41B which has been preset as shown in FIG. 9B. Thus, only the thick ink image signal is generated and binarized, and only the thick ink head is driven to form an image.

The moving speed $V_2$ of the recording head in the thick ink head exclusive use mode is determined at $V_2 = V_1 = 10$ inch/sec in order to obtain a printed density of 400 DPI in the moving direction (arrow 129) of the recording head which is driven at 4 kHz.

Next, a thin ink head exclusive use mode, a recording mode when the thick ink head fails, will be described.

A failure of the thick ink head can be detected in a manner similar to that of the thin ink head. In this case, the thick/thin mode switching signal 80 is changed into a thin ink head exclusive use mode. The thick/thin sorting portion 41 selects the thick/thin sorting table 41C which has been preset as shown in FIG. 9B, so that only the thin ink head is driven to form an image.

The moving speed $V_3$ of the recording head in the thin ink head exclusive use mode is determined at $V_3 = 5$ inch/sec in order to obtain a printed density of 800 DPI in the moving direction (arrow 129) of the recording head which is driven at 4 kHz.

The thin ink head carries out the ink deposition at 800 DPI. This is based on the experimental fact that depositing the thin ink twice the amount of the thick ink results in an image substantially equivalent to that formed by the thick ink when the density of the thin ink is ½ that of the thick ink.

An optimum value of the printed density ratios of the thick and thin ink head dual use mode, the thick ink head exclusive use mode, and the thin ink head exclusive use mode, is not restricted to the above mentioned values, but should be determined considering a dye ratio of the thick and thin inks, a color developing characteristic of a recording medium, or the like.

Although the thick/thin mode switching signal is changed by detecting a failed head by reading a test print in the above described embodiment, other methods can be employed. For example, the thick/thin mode switching signal can be changed by a user who pushes a thick/thin transfer switch provided on the apparatus if he finds a failure by visual inspection.

EMBODIMENT 5

Although the printed density ratios between the respective modes are changed by altering the moving speed of the recording heads while maintaining the driving frequency of the recording heads in the fourth embodiment, the present invention is not restricted to this. For example, the printed density ratios can also be changed by the following measures.

(1) By changing the driving frequency of the recording heads while maintaining the moving speed of the recording heads.

(2) By changing both the moving speed and the driving frequency of the recording heads.

For example, a moving speed of 10 inch/sec and a driving frequency of 8 kHz will achieve a printed density of 800 DPI.

EMBODIMENT 6

Although the ink jet recording heads in the fourth embodiment are those that operate in a binary mode, the present invention is not restricted to this.

For example, the present invention can also be applied to an ink jet recording head capable of dot modulation, which is disclosed in Japanese Patent Publication No. 14905/1990 (U.S. Pat. No. 4,635,078) by the present assignee. In the case of selecting the thick ink head exclusive use mode in response to detection of a failure of the thin ink head, fine dot recording carried out in the above mentioned manner has an effect of preventing degradation of graininess.

EMBODIMENT 7

The present invention can be applied not only to a system, in which the recording heads move in one direction during printing, but also to a system, in which the recording heads move reciprocatingly.

Furthermore, using the single directional printing in the thick/thin both ink heads use mode, and the bidirectional printing in the thick or thin ink head exclusive use mode, makes it possible to implement a high speed ink jet recording apparatus without introducing a problem of image quality, because this does not involve any color changes due to the difference of deposition order of thick and thin ink.

SUPPLEMENTS

The present invention achieves distinct effect when applied to a recording head or a recording apparatus which has means for generating thermal energy such as electrothermal transducers or laser light, and which causes changes in ink by the thermal energy so as to eject ink. This is because such a system can achieve a high density and high resolution recording.

A typical structure and operational principle thereof is disclosed in U.S. Pat. Nos. 4,723,129 and 4,740,796, and it is preferable to use this basic principle to implement such a system. Although this system can be applied either to on-demand type or continuous type ink jet recording systems, it is particularly suitable for the on-demand type apparatus. This is because the on-demand type apparatus has electrothermal transducers, each disposed on a sheet or liquid passage that retains liquid (ink), and operates as follows: first, one or more drive signals are applied to the electrothermal transducers to cause thermal energy corresponding to recording information; second, the thermal energy induces sudden temperature rise that exceeds the nucleate boiling so as to cause the film boiling on heating portions of the recording head; and third, bubbles are grown in the liquid (ink) corresponding to the drive signals. By using the growth and collapse of the bubbles, the ink is expelled from at least one of the ink ejection orifices of the head to form one or more ink drops. The drive signal in the form of a pulse is preferable because the growth and collapse of the bubbles can be achieved instantaneously and suitably by this form of drive signal. As a drive signal in the form of a pulse, those described in U.S. Pat. Nos. 4,463,359 and 4,345,262 are preferable. In addition, it is preferable that the rate of temperature rise of the heating portions described in U.S. Pat. No. 4,313,124 be adopted to achieve better recording.

U.S. Pat. Nos. 4,558,333 and 4,459,600 disclose the following structure of a recording head, which is incorporated to the present invention: this structure includes heating portions disposed on bent portions in addition to a combination of the ejection orifices, liquid passages and the electrothermal transducers disclosed in the above patents. Moreover, the present invention can be applied to structures disclosed in Japanese Patent Application Laying-open Nos. 123670/1984 and 138461/1984 in order to achieve similar effects. The former discloses a structure in which a slit common to all the electrothermal transducers is used as ejection orifices of the electrothermal transducers, and the latter discloses a structure in which openings for absorbing pressure waves caused by thermal energy are formed corresponding to the ejection orifices. Thus, irrespective of the type of the recording head, the present invention can achieve recording positively and effectively.

The present invention can be also applied to a so-called full-line type recording head whose length equals the maximum length across a recording medium. Such a recording head may consists of a plurality of recording heads combined together, or one integrally arranged recording head.

In addition, the present invention can be applied to various serial type recording heads: a recording head fixed to the main assembly of a recording apparatus; a conveniently replaceable chip type recording head which, when loaded on the main assembly of a recording apparatus, is electrically connected to the main assembly, and is supplied with ink therefrom; and a cartridge type recording head integrally including an ink reservoir.

It is further preferable to add a recovery system, or a preliminary auxiliary system for a recording head as a constituent of the recording apparatus because they serve to make the effect of the present invention more reliable. Examples of the recovery system, are a capping means and a cleaning means for the recording head, and a pressure or suction means for the recording head. Examples of the preliminary auxiliary system, are a preliminary heating means utilizing electrothermal transducers or a combination of other heater elements and the electrothermal transducers, and a means for carrying out preliminary ejection of ink independently of the ejection for recording. These systems are effective for reliable recording.

The number and type of recording heads to be mounted on a recording apparatus can be also changed. For example, only one recording head corresponding to a single color ink, or a plurality of recording heads corresponding to a plurality of inks different in color or concentration can be used. In other words, the present invention can be effectively applied to an apparatus having at least one of the monochromatic, multi-color and full-color modes. Here, the monochromatic mode performs recording by using only one major color such as black. The multi-color mode carries out recording by using different color inks, and the full-color mode performs recording by color mixing.

Furthermore, although the above-described embodiments use liquid ink, inks that are liquid when the recording signal is applied can be used: for example, inks can be employed that solidify at a temperature lower than the room temperature and are softened or liquefied in the room temperature. This is because in the ink jet system, the ink is generally temperature adjusted in a range of 30° C.–70° C. so that the viscosity of the ink is maintained at such a value that the ink can be ejected reliably.

In addition, the present invention can be applied to such apparatus where the ink is liquefied just before the ejection by the thermal energy as follows so that the ink is expelled from the orifices in the liquid state, and then begins to solidify on hitting the recording medium, thereby preventing the ink evaporation: the ink is transformed from solid to liquid state by positively utilizing the thermal energy which would otherwise cause the temperature rise; or the ink, which is dry when left in air, is liquefied in response to the thermal energy of the recording signal. In such cases, the ink may be retained in recesses or through holes formed in a porous sheet as liquid or solid substances so that the ink faces the electrothermal transducers as described in Japanese Patent Application Laying-open Nos. 56847/1979 or 71260/1985. The present invention is most effective when it uses the film boiling phenomenon to expel the ink.

Furthermore, the ink jet recording apparatus of the present invention can be employed not only as an image output terminal of an information processing device such as a computer, but also as an output device of a copying machine including a reader, and as an output device of a facsimile apparatus having a transmission and receiving function.

The present invention has been described in detail with respect to various embodiments, and it will now be apparent from the foregoing to those skilled in the art that changes and modifications may be made without departing from the invention in its broader aspects, and it is the intention, therefore, in the appended claims to cover all such changes and modifications as fall within the true spirit of the invention.

What is claimed is:

1. A color image forming apparatus comprising:
    means for producing first image signals associated with a plurality of color families;
    means for performing an image signal conversion processing which converts at least one of the first image signals into N second image signals, N being an integer equal to or greater than two, and each of the N second image signals being associated with one of N color materials which belong to a same color family and have different densities; and
    means for performing a color masking process based on the second image signals obtained by the image signal conversion processing by performing a predetermined operation based upon a plurality of second image signals belonging to different color families to output corrected third image signals corresponding to respective ones of the second image signals,
    wherein the first image signals associated with the plurality of color families comprise at least three image signals associated with cyan, magenta and yellow, and wherein said means for performing an image signal conversion processing separates the first image signals associated with cyan, magenta and yellow into the second image signals associated with thick cyan and thin cyan, thick magenta and thin magenta, and thick yellow and thin yellow, respectively.

2. The color image forming apparatus as claimed in claim 1, further comprising means for mounting a plurality of sets of ink jet recording heads, each of the ink jet recording heads of a same set discharging as fine ink one of a plurality of recording materials which belong to a same color family and have different densities.

3. The color image forming apparatus as claimed in claim 2, wherein each of said ink jet recording heads comprises electrothermal converting elements that generate thermal energy which causes a film boiling in the recording material, the thermal energy being used to discharge the recording material.

4. The color image forming apparatus as claimed in claim 1, further comprising means for mounting a plurality of sets of ink jet recording heads, each of the plurality of sets being associated with one of cyan, magenta and yellow, and each of the ink jet recording heads of a same set discharging as fine ink one of a plurality of recording materials which belong to a same color family and have different densities.

5. The color image forming apparatus as claimed in claim 1, wherein said means for performing a color masking process comprises means for performing a first-order conversion of the second image signals.

6. The color image forming apparatus as claimed in claim 1, wherein said means for performing a color masking process comprises means for performing a second-order conversion of the second image signals.

7. The color image forming apparatus as claimed in claim 1, further comprising means for generating a black image signal based on the three first image signals, wherein said means for performing an image signal conversion processing converts the first image signals and the black image signal into eight second image signals associated with thick cyan, thin cyan, thick magenta, thin magenta, thick yellow, thin yellow, thick black and thin black, respectively, and wherein said means for performing a color masking process comprises means for performing a first-order conversion of the eight second image signals.

8. A color image forming apparatus on which a plurality of sets of ink jet recording heads are mountable, each of the ink jet recording heads of a same set discharging as fine ink one of a plurality of color materials which belong to a same color family and have different densities, the color image forming apparatus comprising:
    means for producing first image signals, each of which is associated with a color of one family of a plurality of color families;
    image converting means for converting at least one of the first image signals into N second image signals, N being an integer equal to or greater than two, and each of the N second image signals being associated with one of N color materials which belong to a same color family and have different densities;
    detecting means for detecting a failure of the ink jet recording heads;
    mode selecting means for selecting one of predetermined recording modes of the ink jet recording heads in response to a detection signal outputted from said detecting means; and control means for changing a recording density on a recording medium in accordance with a recording mode selected by said mode selecting means, wherein ink jet recording heads of a same set comprise a thick ink jet recording head associated with thick ink of one color family, and a thin ink jet recording head associated with thin ink of the one color family, and wherein said mode selecting means selects a first mode which uses both the thick ink head and thin ink head of each set if the detection signal indicates that both heads of each set have not failed, selects a second mode which uses only the thin ink head of each set if the detection signal indicates that at least one of the thick ink heads has failed and selects a third mode which uses only the thick ink head of each set if the detection signal indicates that at least one of the thin ink heads has failed and wherein said image converting means converts the at least one first image signal into the second image signals in accordance with the mode selected by said mode selecting means.

9. The color image forming apparatus as claimed in claim 8, wherein said image converting means comprises a plurality of thick/thin sorting tables, each of the tables being associated with one of the recording modes, and storing predetermined conversion characteristics which are used to convert the first image signals into the second image signals.

10. The color image forming apparatus as claimed in claim 9, further comprising means for causing relative movement between the ink jet recording heads and the recording medium, wherein said control means comprises means for changing a relative speed between the ink jet recording heads and the recording medium.

11. The color image forming apparatus as claimed in claim 10, further comprising means for supplying driving signals to the ink jet recording heads at a driving frequency, wherein said control means further comprises means for changing the driving frequency of the ink jet recording heads.

12. The color image forming apparatus as claimed in claim 9, further comprising means for supplying driving signals to the ink jet recording heads at a driving frequency, wherein said control means comprises means for changing the driving frequency of the ink jet recording heads.

13. The color image forming apparatus as claimed in claim 9, wherein each of said ink jet recording heads comprises electrothermal converting elements that generate thermal energy which causes a film boiling in a recording material, the thermal energy being used to discharge the recording material.

14. The color image forming apparatus as claimed in claim 8, wherein each of said ink jet recording heads is comprises a binary type ink jet recording head that either performs discharging or stops discharging of a color material in response to a second image signal.

15. The color image forming apparatus as claimed in claim 8, wherein each of said ink jet recording head comprises a dot modulation type ink jet recording head that modulates a discharging volume of a color material in response to the second image signal.

16. The color image forming apparatus as claimed in claim 8, wherein each of said ink jet recording heads comprises a bidirectional type ink jet recording head which performs recording while moving back and forth across the recording medium.

17. A color image forming method comprising the steps of:

producing first image signals associated with a plurality of color families;

performing an image signal conversion processing which converts at least one of the first image signals into N second image signals, N being an integer equal to or greater than two, and each of the N second image signals being associated with one of N color materials which belong to a same color family and have different densities;

performing a color masking process based on the second image signals obtained by the image signal conversion processing by performing a predetermined operation based upon a plurality of second image signals belonging to different color families to output corrected third image signals corresponding to respective ones of the second image signals, wherein the first image signals associated with the plurality of color families comprise at least three image signals associated with cyan, magenta and yellow, and wherein in said step for performing an image signal conversion processing the first image signals associated with cyan, magenta and yellow are separated into the second image signals associated with thick cyan and thin cyan, thick magenta and thin magenta, and thick yellow and thin yellow, respectively.

18. The color image forming method as claimed in claim 17, wherein said step of performing a color masking process comprises a step of performing a first-order conversion of the second image signals.

19. The color image forming method as claimed in claim 17, wherein said step of performing a color masking process comprises the step of performing a second-order conversion of the second image signals.

20. The color image forming method as claimed in claim 17, further comprising the step of generating a black image signal based on the three first image signals, wherein said step of performing an image signal conversion processing comprises the step of converting the first image signals and the black image signal into eight second image signals associated with thick cyan, thin cyan, thick magenta, thin magenta, thick yellow, thin yellow, thick black and thin black, respectively, and wherein said step of performing a color masking process comprises the step of performing a first-order conversion of the eight second image signals.

21. A color image forming method applied to an apparatus on which a plurality of sets of ink jet recording heads are mountable, each of the ink jet recording heads of a same set discharging as fine ink one of a plurality of color materials which belong to a same color family and have different densities, the color image forming method comprising the steps of:

producing first image signals, each of which is associated with a color of one family of a plurality of color families;

converting at least one of the first image signals into N second image signals, N being an integer equal to or greater than two, and each of the N second image signals being associated with one of the N color materials which belong to a same color family and have different densities;

detecting a failure of the ink jet recording heads and outputting a detection signal;

selecting one of predetermined recording modes of the ink jet recording heads in response to the detection signal; and changing a recording density on a recording medium in accordance with a recording made selected in said selecting step, wherein ink jet recording heads of a same set comprise a thick ink jet recording head associated with thick ink of one color family, and a thin ink jet recording head associated with thin ink of the one color family, and wherein in said mode selecting step a first mode which uses both the thick ink head and thin ink head of each set is selected if the detection signal indicates that both heads of each set have not failed, a second mode which uses only the thin ink head of each set is selected if the detection signal indicates that at least one of the thick ink heads has failed and a third mode which uses only the thick ink head of each set is selected if the detection signal indicates that at least one of the thin ink heads has failed, and wherein in said converting step the at least one first image signal is converted into the second image signals in accordance with the mode selected in said selecting step.

22. The color image forming method as claimed in claim 21, wherein said step of converting comprises the step of selecting one of a plurality of thick/thin sorting tables, each of the tables being associated with one of the recording modes, and storing predetermined conversion characteristics which are used to convert the first image signals into the second image signals.

23. The color image forming method as claimed in claim 22, further comprising the step of causing relative movement between the ink jet recording heads and the recording medium, wherein said step of changing a recording density comprises the step of changing a relative speed between the ink jet recording heads and the recording medium.

24. The color image forming method as claimed in claim 22, further comprising the step of supplying driving signals to the ink jet recording heads at a driving frequency, wherein said step of changing a recording density comprises the step of changing the driving frequency of the ink jet recording heads.

25. The color image forming method as claimed in claim 23, further comprising the step of supplying driving signals to the ink jet recording heads at a driving frequency, wherein said step of changing a recording density comprises the step of changing the driving frequency of the ink jet recording heads.

26. The color image forming method as claimed in claim 22, wherein each of said ink jet recording heads comprises electrothermal converting elements that generate thermal energy which causes a film boiling in the recording material, the thermal energy being used to discharge the recording material.

27. The color image forming method as claimed in claim 21, wherein each of said ink jet recording heads comprises a binary type ink jet recording head that either performs discharging or stops discharging of the color material in response to a second image signal.

28. The color image forming method as claimed in claim 21, wherein each of said ink jet recording heads comprises a dot modulation type ink jet recording head that modulates a discharging volume of the color material in response to the second image signal.

29. The color image forming method as claimed in claim 21, wherein each of said ink jet recording heads comprises a bidirectional type ink jet recording head which performs recording while moving back and forth across the recording medium.

30. A color image forming apparatus comprising:
means for producing first image signals associated with a plurality of color families;
means for performing an image signal conversion processing which converts at least one of the first image signals into N second image signals, N being an integer equal to or greater than two, and each of the N second image signals being associated with one of N color materials which belong to a same color family and have different densities; and
means for performing a color masking process based on at least the second image signals obtained by the image signal conversion processing by performing a predetermined operation based upon at least a plurality of second image signals to output at least corrected third image signals corresponding to respective ones of the second image signals.

31. An image forming apparatus on which a plurality of sets of ink jet recording heads are mountable, each of the ink jet recording heads of a same set discharging as fine ink one of a plurality of color materials which belong to a same color family and have different densities, the image forming apparatus comprising:
means for producing at least one first image signal;
image converting means for converting at least one of the first image signals into N second image signals, N being an integer equal to or greater than two, and each of the N second image signals being associated with one of N color materials which belong to a same color family and have different densities;
detecting means for detecting a failure of the ink jet recording heads;
mode selecting means for selecting one of predetermined recording modes of the ink jet recording heads in response to a detection signal outputted from said detecting means; and
control means for changing a recording density on a recording medium in accordance with a recording mode selected by said mode selecting means, wherein ink jet recording heads of a same set comprise a thick ink jet recording head associated with thick ink of one color family, and a thin ink jet recording head associated with thin ink of the one color family, and wherein said mode selecting means selects a first mode which uses both the thick ink head and thin ink head of each set if the detection signal indicates that both heads of each set have not failed, selects a second mode which uses only the thin ink head of each set if the detection signal indicates that at least one of the thick ink heads has failed and selects a third mode which uses only the thick ink head of each set if the detection signal indicates that at least one of the thin ink heads has failed and wherein said image converting means converts the at least one first image signal into the second image signals in accordance with the mode selected by said mode selecting means.

32. An image forming apparatus on which at least one set of ink jet recording heads is mountable, each of the ink jet recording heads of a same set discharging one of a plurality of inks which belong to a same color family and have different densities, ink jet recording heads of a same set comprise a thick ink jet recording head associated with thick ink of one color family, and a thin ink jet recording head associated with thin ink of the one color family, the image forming apparatus comprising:
detecting means for detecting a failure of ink discharge of the ink jet recording heads;
mode selecting means for selecting, in response to a detection signal outputted from said detecting means, a recording mode of the ink jet recording heads from among i) a mode to use both of thick and thin ink,
ii) a mode to use only thin ink, and
iii) a mode to use only thick ink;

first control means for controlling the driving of the ink jet recording heads in accordance with a recording mode selected by said mode selecting means; and second control means for setting a recording density on a recording medium in accordance with the mode selected by the mode selection means, wherein said mode selecting means selects the mode which uses only thick ink from the thick ink head of each set if the detection signal indicates that ink discharge of the thin ink head has failed, and the mode which uses only thin ink head of each set if th detection signal indicates that ink discharge of the thick ink head has failed.

* * * * *

UNITED STATES PATENT AND TRADEMARK OFFICE
CERTIFICATE OF CORRECTION

PATENT NO.  : 6,130,686
DATED       : October 10, 2000
INVENTOR(S) : DANZUKA ET AL.

Page 1 of 2

It is certified that error appears in the above-identified patent and that said Letters Patent is hereby corrected as shown below:

[56] References Cited:
  FOREIGN PATENT DOCUMENTS, "2014905" should read --2-14905--.

COLUMN 1:
  Line 32, "a" should be deleted.

COLUMN 2:
  Line 10, "Value" should read --value--.
  Line 20, "is-disclosed" should read --is disclosed--.

COLUMN 3:
  Line 51, "arises" should read --causes--.

COLUMN 5:
  Line 61, "comprises" should read --comprise--.

COLUMN 13:
  Line 12, "above" should read --above- --.

COLUMN 14:
  Line 16, "drops" should read --droplets--.
  Line 45, "consists" should read --consist--.
  Line 59, "system," should read --system--.
  Line 62, "system," should read --system--.

UNITED STATES PATENT AND TRADEMARK OFFICE
CERTIFICATE OF CORRECTION

PATENT NO. : 6,130,686

DATED : October 10, 2000

INVENTOR(S) : DANZUKA ET AL.

It is certified that error appears in the above-identified patent and that said Letters Patent is hereby corrected as shown below:

COLUMN 17:
 Line 52, "is" should be deleted.
 Line 57, "head" should read --heads--.

COLUMN 18:
 Line 9, "densities;" should read --densities; and--.

Signed and Sealed this

First Day of May, 2001

Attest:

NICHOLAS P. GODICI

Attesting Officer     Acting Director of the United States Patent and Trademark Office